Aug. 27, 1946.  C. S. BATCHELOR  2,406,653
BONDED FRICTION ASSEMBLY
Filed June 10, 1944  2 Sheets-Sheet 1
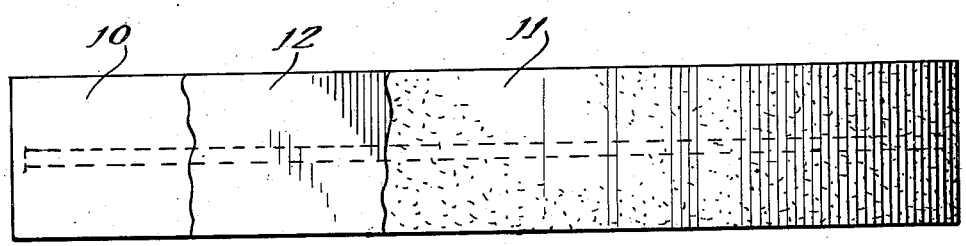
Fig. 1.
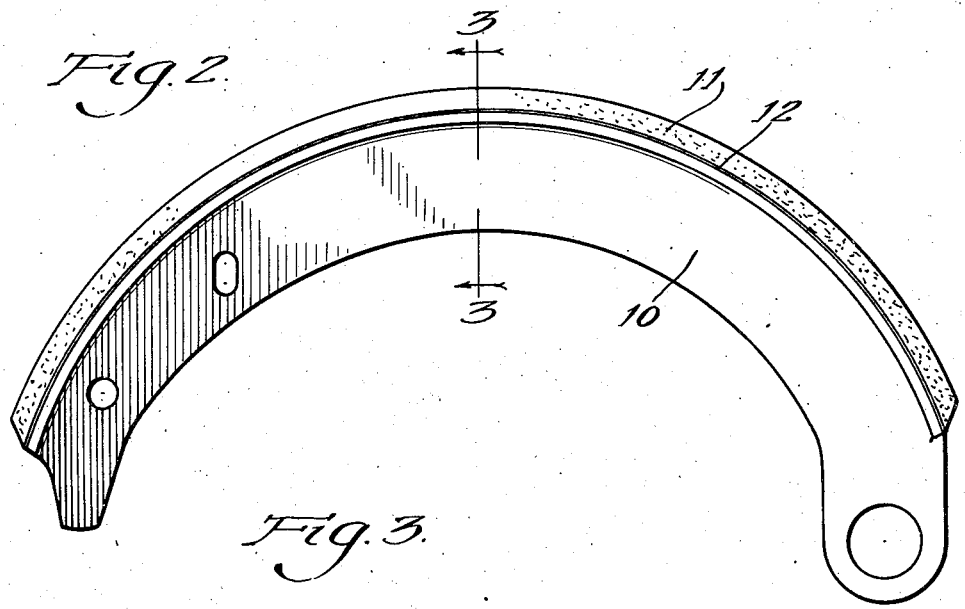
Fig. 2.
Fig. 3.
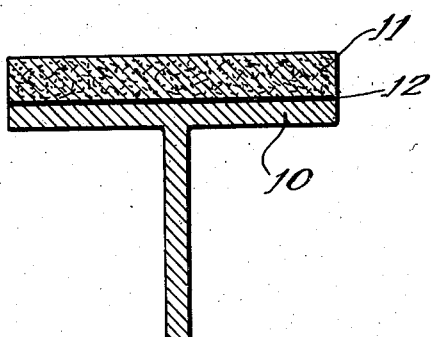
Inventor:
Clyde S. Batchelor
By: Lee J. Gary
Attorney Aug. 27, 1946.   C. S. BATCHELOR   2,406,653
BONDED FRICTION ASSEMBLY
Filed June 10, 1944   2 Sheets-Sheet 2
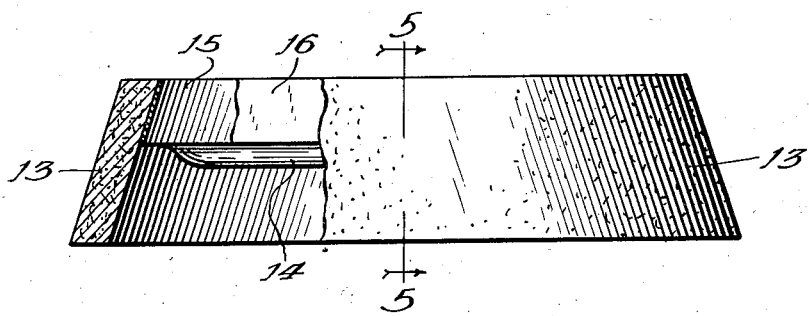
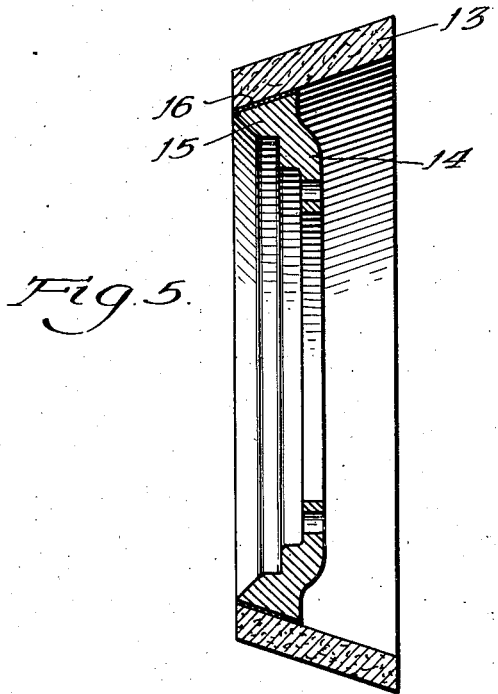
Inventor:
By Clyde S. Batchelor
Lee J. Gary
Attorney Patented Aug. 27, 1946

2,406,653

UNITED STATES PATENT OFFICE 2,406,653

BONDED FRICTION ASSEMBLY

Clyde S. Batchelor, Nichols, Conn., assignor to Raybestos-Manhattan, Inc., Passaic, N. J., a corporation of New Jersey Application June 10, 1944, Serial No. 539,657

9 Claims. (Cl. 188—234)

This invention relates to improvements in friction assemblies such as brakes and clutches comprising a layer of friction material and a metallic or supporting mounting element therefor, and to the method of cementing or bonding the friction material to the metallic supporting element.

It has heretofore been proposed to bond or cement brake linings or clutch facings with their respective mounting or metallic supporting elements by means of adhesives such as heat hardenable synthetic resins for the purpose of avoiding or eliminating the necessity for use of rivets, or drilling, boring, or counterboring and registering the component parts; or with the end in view of eliminating waste or portions of the thickness of the friction material or for the prevention of scoring of the mating surfaces, such as the brake drums, by means of projecting rivets when the friction material or lining becomes worn; or for the purpose of obtaining a better union between the adjacent surfaces of the friction material and the metallic mounting support so as to spread torsional stresses and also to induce more even mating and wear of the friction material.

The attempts or proposals to directly bond friction material such as brake linings, conventionally composed of a densified hard composition of asbestos fibers, mineral fillers and a heat hardenable binder, to the brake shoe by means of a heat curable binder such as a synthetic resin, has rendered the normal removal and replacement of the friction lining difficult and at times detrimental to the metallic support and particularly when the attempt at removal and replacement is to be carried out at a customary service station, since a conventional hard friction element or layer of friction material can only with difficulty be removed by the expensive operations of grinding and chiseling entailing skillful labor and time, and which always have the tendency to damage the brake shoe or other metallic mounting surface.

In order to render the operation of removal and replacement of bonded brake linings less difficult and expensive, and to prevent injury of the metallic supporting surface, it has been proposed in United States Patent No. 2,272,532 to bond brake linings to brake shoes by the interposition of one or more layers of a material similar to that of which the brake lining is composed, that is, of asbestos, fillers and a binder, but of a relatively softer nature than the hard and densified brake lining, that is, a cleavable brake lining material coated with a heat hardenable resin, this material being separable along lines roughly parallel to its faces so as to permit it to be readily stripped or ground from the brake shoe or band.

It will be readily apparent, however, that the very advantage of such proposal from a service standpoint is detrimental in applied usage, since such cleavage plane presents a point of weakness during operation, particularly under high temperature, high speed and heavy duty operation resulting in failure from premature and undesirable cleavage or separation.

In accordance with the present invention it is proposed to bond friction material such as brake linings, clutch facings or other clutch structural elements, composed of conventional hard, dense, formed friction material to brake shoes, clutch facings, cone clutch element supports and the like, by means of a heat hardenable binder with the attendant advantages of a strong uniform bond and the elimination of conventional rivets, drilling and the like, and also avoidance of the detrimental effects of interposed, readily cleavable materials or compositions, in a manner which at the same time permits separation of old or worn friction materials from their metallic mounting supports and the ready replacement thereof without the necessity for a high degree of skill, excessive labor costs, and potential damage to metallic parts in such operation.

The objects of the present invention are in general accomplished by interposing between the surfaces of a friction element, such as a conventional pre-formed friction lining, clutch facing, or clutch structural element, and a metallic mounting or supporting element therefor, an interlayer composed of a relatively thin network, web or sheet of cellulose fibres coated with a heat hardenable bonding agent such as a synthetic resin, and subjecting the assembly to heat and pressure to cure the resin and to bond the friction material to the metallic element, the cured resin permeating the interlayer and joining the friction material to the metallic member. When occasion for replacement for the friction material arises, it may be separated from the metallic surface to which it is bonded by soaking the assembly in a caustic solution which penetrates and effects at least the cellulose of the interlayer, to cause material disintegration and swelling of the interlayer, to thereby render the friction material readily separable.

The invention, the method of carrying out the same, and the advantages thereof will be more particularly described with reference to the accompanying drawings wherein:

Fig. 1 is a plan view with parts broken away of a brake shoe assembly formed in accordance with the present invention.

Fig. 2 is a side elevation of the brake shoe assembly of Fig. 1.

Fig. 3 is a section on the line 2—2 of Fig. 2.

Fig. 4 is a plan view with parts broken away of a cone clutch assembly formed in accordance with my invention.

Fig. 5 is a sectional view on the line 5—5 of Fig. 4.

Referring to the drawings, particularly Figs. 1 to 3, there is illustrated a conventional brake shoe 10 having bonded thereto a brake lining 11 by means of interlayer 12. The friction material 11 may be of conventional brake lining composition such as asbestos, mineral fillers and a heat hardened binder and may have been cut from a roll or have been supplied in the form of a shaped segment. The interlayer 12 is composed of a permeable network or web of cellulose fibres such as for example a felted fibrous sheet of paper.

The surfaces of the interlayer 12 are coated, by spraying, brushing, etc., with a heat hardenable binder such as for example a thermo-setting synthetic resin, one example of such resin of those commercially available being the phenolic resins. After the assembly has been formed, that is, the interlayer 12 interposed between the brake shoe 10 and the brake lining 11, the component portions are clamped together by means of suitable clamps, or other pressure devices or platens not illustrated, and the friction material bonded to the brake shoe, while applying or maintaining pressure through the indicated devices, by means of a heat source such as for example, radiant heat, direct electrical resistance, steam heated platens and the like well known heating means, the pressure and heat and degrees thereof being applied for a period of time sufficient to bond the components into an assembly and to cure the resin.

In accordance with the present invention the employment of ordinary kraft paper having a thickness of approximately .003 inch sprayed or painted on both surfaces with a solution of a heat hardenable phenolic resin, has been found satisfactory, the pressure and heat curing operation causing the binder to penetrate the interlayer and to bond the friction material to the metallic element therethrough, and to thus destroy any inherent cleavage properties of the interlayer. While the resulting firm bond prevents ready removal or separation of the layer of friction material from the metallic support, it of course also prevents any operative surface failure by reason of premature cleavage or separation.

However, by reason of the fact that cellulose is attacked by a caustic solution and swells materially, the friction material as applied in accordance with the present invention can be removed and replaced when desired by subjecting the bonded assembly to soaking, for example from about 3 to 5 hours in a strong caustic solution such as for example a 50% sodium hydroxide solution. Although it is impossible to appreciably attack cured resin such as the phenolic resins, with caustic, when the resin is in a continuous form, it is believed that in accordance with the present invention such resin is to a degree attacked by the strong caustic solution by reason of the fact that the resin penetrates a network of the cellulose fibres. In any event the cellulose fibres are directly attacked by the caustic solution resulting in a weakening of the fibre portion of the structure, penetration of the fibrous cellulose structure allowing intimate contact with the bonding material, and the action of the caustic further induces swelling of the cellulose to exert a wedging action between the friction material and the metallic support, all of which permits the friction material or lining 11 to be readily removed or split off from the brake shoe 10 by inserting a tool between the adjacent faces of the brake shoe 10 and the lining 11, without, however, necessitating the use of force to a degree which would tend to damage the surface of the brake shoe or requirement for finish grinding to a degree which would be necessary if the lining 11 had been directly bonded to the shoe 10 in the absence of the caustic disintegratable interlayer or liner 12.

In accordance with the present invention it has been further found that when the paper or other cellulose web of which the interlayer 12 is formed is thinner than .001 inch, the resin or other bonding agent penetrates so thoroughly from both surfaces that the material will disintegrate very slowly if at all in a caustic solution. On the other hand, when the interlayer is thicker than about .005 inch, penetration is insufficient and some traces of a cleavage plane may be present in the intermediate zone. Between these approximate limitations a firm bond may be obtained which does not exhibit any planes of cleavage during the most critical conditions of usage but which nevertheless may be weakened and softened to permit separation by attack of a caustic solution on the interlayer and particularly the cellulose fibres thereof when it is desired to remove and replace the friction material.

Figs. 4 and 5 illustrate another form of friction assembly and more specifically a particular form of clutch assembly wherein employment is made of a cone clutch structural element 13 in the form of a hollow regular truncated cone having a relatively thickened wall, composed of a substantially uniform mixture of asbestos fibers, a heat hardened synthetic resin binder and conventional friction material mineral fillers. The clutch element 13 is supported by means of a supporting plate 14 adapted to be secured to the flange of a shaft such as a crank shaft. The plate 14 is provided with a relatively narrow coned rim 15, the clutch element 13 being joined to the face of the coned rim 15 by means of an interlayer 16, the layer 16 being of a similar or like nature to the interlayer 12 previously described.

In like manner the cone clutch element 13 may be joined to the rim 15 of the supporting plate 14 by the application of suitable heat and pressure in the manner previously indicated with respect to Figs. 1 and 3, to bond the friction material 13 to the surface of the metallic support 15 to form a firmly bonded structure suitable for use as a driving or driven member capable of transmitting torque.

Although in the foregoing two forms of friction assembly have been illustrated it will be readily understood that other forms of friction assembly may be employed for automotive or industrial uses and formed in accordance with the present invention wherein pre-formed friction material is to be joined to a metallic mounting surface by means of a firm bond, but which bond is disintegratable for replacement purposes so as to enable ready separation of the friction material from the metallic support when occasion requires.

I have referred specifically to synthetic resins in the foregoing specification as an example of a good type of bonding material for coating the cellulose strip. The invention in its broad aspects is not restricted to the use of synthetic resin as the bonding material but in its broad aspect embraces any bonding material which will form a satisfactory bond at temperatures between about 200° F. and about 400° F. and which will not be destroyed at abnormal service temperatures of say 550° F. at the bond. Thus, in addition to the phenol-formaldehyde type of resin hereinbefore discussed, I may use other synthetic resins as well as other binders, including the Vinylites, Bunas, neoprenes, resin-oils and the like. The terms "heat hardenable," "heat setting" and "heat curing" as used in the specification and claims are intended to embrace binders of the foregoing type.

The principal vitalizing feature of the present invention is the provision of an intermediate bonding element comprising a relatively thin network of cellulose fibers.

I claim as my invention:

1. A friction assembly comprising a friction element, a metallic supporting element therefor and an intermediate bonding element comprising a network of cellulose fibres having a thickness of from about .001 to about .005 inch permeated with a cured resin.

2. A friction assembly comprising a layer of formed friction material in adhesive bonded engagement with the surface of a metallic supporting element and an intermediate cellulosic fibre web having a thickness of from about .001 to about .005 inch permeated with a heat hardened binder.

3. A friction assembly comprising a layer of formed friction material, a metallic supporting and mounting element therefor, and an intermediate sheet of felted cellulose fibres having a thickness of from about .001 to about .005 inch, the friction element being bonded to a surface of the metallic element by means of a synthetic resin permeating the intermediate sheet.

4. A friction assembly comprising a layer of formed friction material in bonded engagement with the surface of a metallic mounting and supporting element, and an intermediate layer comprising a network of cellulose fibres having a thickness of from about .001 to about .005 inch.

5. A friction assembly comprising a layer of formed friction material in bonded engagement with the surface of a metallic mounting and supporting element, and an intermediate layer comprising a network of cellulose fibres having a thickness of approximately .003 inch.

6. A friction assembly comprising a layer of formed friction material, a metallic mounting and supporting element therefor, and an interlayer of cellulose fibres having a thickness of from about .001 to about .005 inch, the friction material being bonded to the surface of the metallic element by means of a heat cured synthetic resin permeating the cellulose fibre interlayer.

7. A friction assembly comprising a brake shoe, a brake lining, and an interlayer of cellulose fibres having a thickness of from about .001 to about .005 inch, the brake lining being bonded to the shoe by means of a synthetic resin heat cured in place and permeating the interlayer.

8. A friction assembly comprising a clutch element of formed friction material, a metallic mounting element therefor, and an interlayer of cellulose fibres having a thickness of from about .001 to about .005 inch, the clutch friction element being bonded to a surface of the metallic mounting element by means of a synthetic resin heat cured in place and permeating the interlayer.

9. A friction assembly comprising a friction element, a metallic supporting element therefor and an intermediate bonding element comprising a network of cellulose fibres having a thickness of from about .001 to about .005 inch and a heat hardenable binder.

CLYDE S. BATCHELOR.